United States Patent [19]

Hashimoto

[11] Patent Number: 5,748,625
[45] Date of Patent: May 5, 1998

[54] INTER-LAN CONNECTION METHOD USING ISDN

[75] Inventor: Akira Hashimoto, Tokyo, Japan

[73] Assignee: NEC Corporation, Japan

[21] Appl. No.: 801,909

[22] Filed: Feb. 14, 1997

Related U.S. Application Data

[63] Continuation of Ser. No. 633,007, Apr. 16, 1996, abandoned, which is a continuation of Ser. No. 346,023, Nov. 29, 1994, abandoned.

[30] Foreign Application Priority Data

Nov. 29, 1993 [JP] Japan ..................... 5-298047

[51] Int. Cl.$^6$ .................... H04L 12/46; H04L 12/66
[52] U.S. Cl. ............... 370/353; 370/401; 370/467; 370/524
[58] Field of Search ................. 370/352, 353, 370/389, 395, 400, 401, 402, 419, 420, 465, 466, 467, 469, 522, 524, 904; 340/825.03, 825.5, 825.51, 825.52; 379/93.94; 395/200.02, 200.15, 200.2, 500

[56] References Cited

U.S. PATENT DOCUMENTS

| | | | |
|---|---|---|---|
| 4,486,878 | 12/1984 | Havermans | 370/60 |
| 4,731,782 | 3/1988 | Shimizu et al. | 370/60 |
| 4,888,766 | 12/1989 | Ogasawara | 370/110.1 |
| 4,996,685 | 2/1991 | Farese et al. | 370/58.1 |
| 5,161,155 | 11/1992 | Dyer et al. | 370/110.1 |
| 5,181,199 | 1/1993 | Motoki et al. | 370/60 |
| 5,208,806 | 5/1993 | Hasegawa | 370/60.1 |
| 5,208,811 | 5/1993 | Kashio et al. | 370/110.1 |
| 5,315,595 | 5/1994 | Allouis et al. | 370/110.1 |
| 5,347,516 | 9/1994 | Yoshida | 370/85.13 |

FOREIGN PATENT DOCUMENTS 2-126746  5/1990  Japan.
3-44236  2/1991  Japan.

Primary Examiner—Alpus H. Hsu
Attorney, Agent, or Firm—Ostrolenk, Faber, Gerb & Soffen, LLP

[57] ABSTRACT

Inter-LAN connection using an ISDN, in which two LANs are connected to each other by an inter-LAN connection apparatus through the ISDN, includes using, as the ISDN, an INS net 64, for example, for providing at least two B channels and one D channel. The inter-LAN connection apparatus has a section for setting a circuit switching mode in a first B channel, of the B channels and the D channel, assigned as a data transfer channel and setting a packet switching mode in a second B channel, of the B channels and the D channel, assigned as a control information transfer channel to perform circuit connection when data communication must be performed while dynamic routing is performed.

16 Claims, 1 Drawing Sheet

INTER-LAN CONNECTION METHOD USING ISDN

This is a Continuation of application Ser. No. 08/633,007, filed on Apr. 16, 1996, now abandoned, which is a Continuation of application Ser. No. 08/346,023, filed on Nov. 29, 1994, now abandoned.

BACKGROUND OF THE INVENTION

The present invention relates to an inter-LAN connection in which two LANs (Local Area Networks) are connected to each other through an ISDN (Integrated Services Digital Network).

As is well known, a circuit switching method and a packet switching method are used as switching methods for data communication networks.

The circuit switching method is a switching method represented by a method used in a telephone system. In this method, a communication circuit is set in advance before data communication between users is actually performed. In the circuit switching method, a user receives a charging service, corresponding to a connection time of the circuit, in which charging for using the circuit is performed according to the connection time of the circuit.

In contrast to this, in the packet switching method, information (message) to be transmitted is divided into components each having a proper length, and the components are stored and transferred in a network in units of packets each having control information such as a destination. In this packet switching method, a user receives a measured rate charging service in which charging is performed according to the number of packets (data).

In addition, as a public packet switching network protocol, a protocol defined by Recommendation X.25 of the old CCITT (International Telegraph and Telephone Consultive Committee) is known. Recommendation X.25 of the old CCITT is a recommendation for defining a protocol between a packet (mode) terminal and a public packet switching network to define a network access protocol to be obeyed by users who use the public packet network.

The smallest-scale interface defined by the ISDN is called a basic interface. The basic interface is constituted by two B (information transmitting) channels and one D (signal transmitting) channel (i.e., 2B+D). For example, as ISDN services of NIPPON TELEGRAPH AND TELEPHONE CORP., two types of services, i.e., a service, called an INS (Information Network System) net 64, for providing a basic interface and a service, called an INS net 1500, for providing a high-speed or multiple interface are known.

In the INS net 64, two 64-kbps information channels (B channels) and one 64-kbps signal channel (D channel) are provided in the form of (2B+D). The B channels are used for a circuit switching service and a packet switching service, and the D channel is used for packet switching control. That is, in the INS net 64, a circuit switching mode and a packet switching mode can be respectively used in different channels within one circuit.

In the INS net 1500, 23 64-kbps information channels (B channels) and one 64-kbps signal channel (D channel) are provided in the form of (23B+D). Six B channels can be used as $H_0$ (=384 kbps). The 23 information channels can be used as an $H_1$ (=1536 kbps) channel. In this case, the D channel is also required. Both the $H_0$ channel and $H_1$ channel are circuit switching channels.

In a conventional technique, when LANs are connected to each other through a switching circuit, a method of performing circuit connection only when data communication must be performed to obtain merits in the charging system of the switching circuit. For this reason, when control information must be periodically transferred as in dynamic routing, a communication circuit is always set in a connected state. Therefore, use of the dynamic routing is avoided, and static routing is used.

As dynamic routing, an RIP (Routing Information Protocol) is generally used, and control information indicating that "Where is a packet transferred to in order to communicate with a host on a target network?", or "What is the distance between an inter-LAN connection apparatus in a source network and a target network?" is transmitted to a distant inter-LAN connection apparatus. When the arrangement of a network changes, the contents of the routing table of the control information are updated in accordance with the change in arrangement. For this reason, the inter-LAN connection apparatus can always recognize the shortest communication route.

The static routing is a method in which information indicating that "Where is a packet transferred to in order to communicate with a host on a target network" is set in an inter-LAN connection apparatus in advance, and communication is performed in a fixed route.

As prior arts according to the present invention, the following prior arts are known. Japanese Patent Laid-Open No. 2-126746 (to be referred to as Prior Art 1 hereinafter) discloses a "network interconnection apparatus" in which an interconnection unit (ICU), connected to a LAN, for performing switching connection to the circuit switching service or packet switching service of the ISDN is arranged to make data communication between circuits of the different switching services possible. Japanese Patent Laid-Open No. 3-44236 (to be referred to as Prior Art 2 hereinafter) discloses a "LAN terminal" in which a circuit processing unit, a token control unit, and a data processing unit are arranged to construct a token ring LAN without specializing a local switching unit and an ISDN circuit, thereby reducing cost for providing a LAN.

As described above, it is assumed that static routing is used in inter-LAN connection performed through a switching circuit. In this case, even when a communication route is changed due to a change in arrangement of a network, an inter-LAN connection apparatus cannot flexibly cope with the change in communication route because the inter-LAN connection apparatus has no means for recognizing the change in communication route. Therefore, until routing information set in the inter-LAN connection apparatus is changed, the inter-LAN connection apparatus cannot communicate with a host on a target network.

SUMMARY OF THE INVENTION

It is an object of the present invention to provide an inter-LAN connection using an ISDN in which dynamic routing can be used, and using a communication circuit set in a connected state during only data communication.

In order to achieve the above object of the present invention, there is provided an inter-LAN connection method using an ISDN in which two LANs are connected to each other by an inter-LAN connection apparatus through the ISDN, comprising the step of using, as the ISDN, an INS net 64 for providing two B channels and one D channel, wherein the inter-LAN connection apparatus has means for setting a circuit switching mode in a B channel, of the two B channels and the D channel, assigned as a data transfer channel and setting a packet switching mode in a B channel, of the two B channels and the D channel, assigned as a control information transfer channel to perform circuit connection only when data communication must be performed while dynamic routing is performed.

DESCRIPTION OF THE PREFERRED EMBODIMENT

Figure 1:
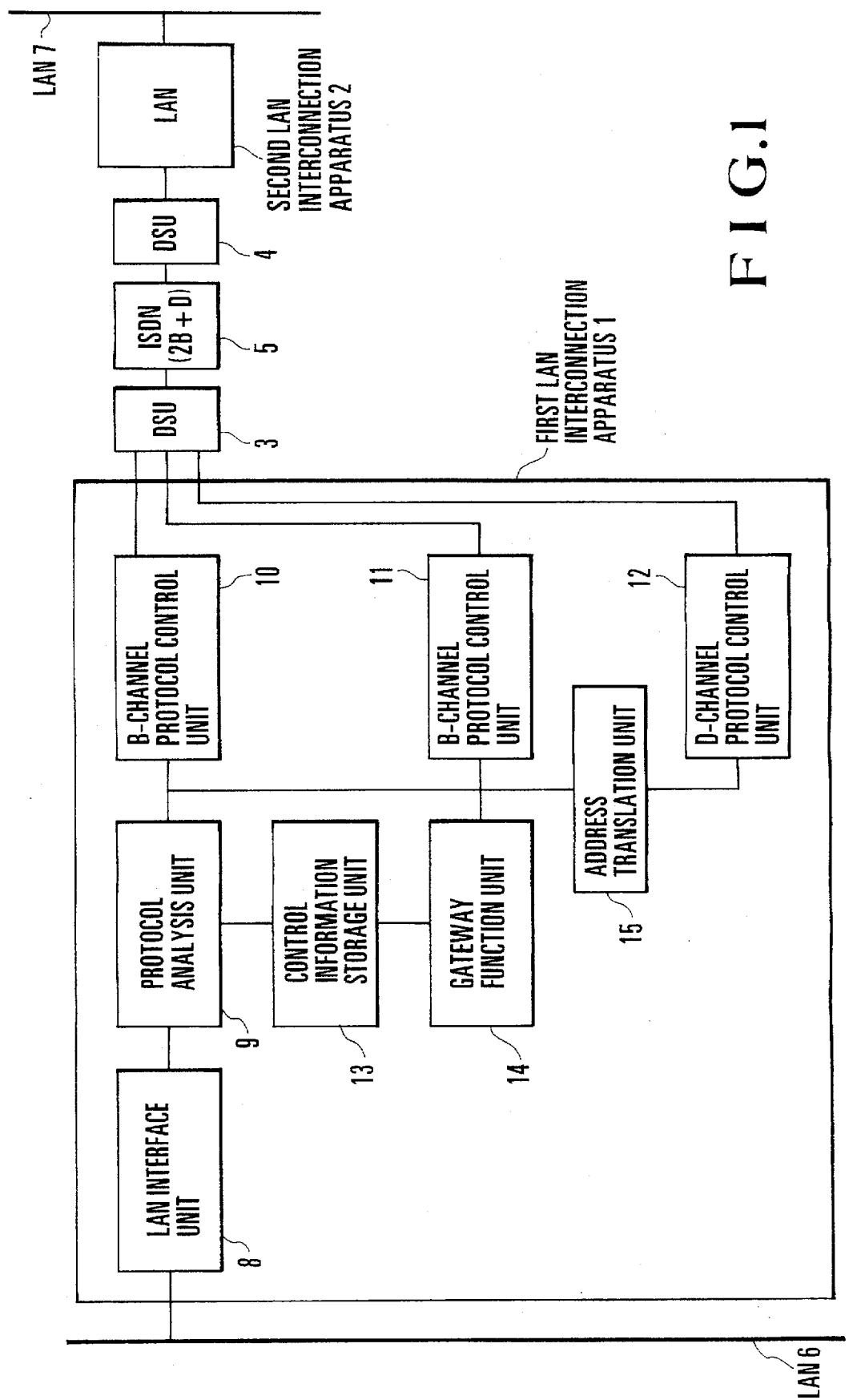
FIG. 1 is a block diagram showing an inter-LAN connection arrangement using an ISDN according to an embodiment of the present invention.

An embodiment of the present invention will be described below with reference to the accompanying drawing.

An inter-LAN connection using an ISDN according to an embodiment of the present invention will be described below with reference to FIG. 1. According to the present invention, a B channel is assigned to a circuit switching mode as a data transfer channel, and a B or D channel is assigned to a packet switching mode as a control information transfer channel. In the arrangement of this embodiment, the B channel is assigned to the packet switching mode.

In the arrangement shown in FIG. 1, a first LAN 6 and a second LAN 7 are connected to each other by a first inter-LAN connection apparatus 1 and a second inter-LAN connection apparatus 2 through an ISDN 5. A first DSU (Digital Service Unit) 3 is connected between the first inter-LAN connection apparatus 1 and the ISDN 5, and a second DSU (Digital Service Unit) 4 is connected between the second inter-LAN connection apparatus 2 and the ISDN 5. The ISDN 5 is an INS net 64 which provides two B channels and one D channel.

The first inter-LAN connection apparatus 1 has the same arrangement as that of the second inter-LAN connection apparatus 2. For this reason, in this case, only the arrangement of the first inter-LAN connection apparatus 1 is shown, and the arrangement of the second inter-LAN connection apparatus 2 is not shown.

The first inter-LAN connection apparatus 1 has a LAN interface unit 8, a protocol analysis unit 9, first and second B-channel protocol control units 10 and 11, a D-channel protocol control unit 12, a control information storage unit 13, a gateway function unit 14, and an address translation unit 15.

1. LAN Interface Unit 8

The LAN interface unit 8 receives a broadcast packet signal serving as control information which is transmitted, as a packet and control information for the LAN 7, from the LAN 6 to all the host computers and inter-LAN connection apparatuses connected to the LAN 6 and transfers the broadcast packet signal to the protocol analysis unit 9.

2. Protocol Analysis Unit 9

The protocol analysis unit 9 identifies data and control information from the packet signal transferred from the LAN interface unit 8, transfers the data to the first B-channel protocol control unit 10 and the address translation unit 15, and transfers the control information to the control information storage unit 13.

3. Control Information Storage Unit 13

The control information storage unit 13 stores the control information transferred from the protocol analysis unit 9 as unique information.

Since the stored control information and a management packet signal such as a keep alive signal between inter-LAN connection apparatuses must be periodically transmitted to the second inter-LAN connection apparatus 2, the control information storage unit 13 transfers the control information and the management packet to the gateway function unit 14 each time the second inter-LAN connection apparatus 2 requires the control information and the management packet signal.

4. Gateway Function Unit 14

The gateway function unit 14 converts the control information transferred from the central information storage unit 13 into an X.25-frame signal to transfer the converted signal to the B-channel protocol control unit 11.

5. B-Channel Protocol Control Unit 11

The B-channel protocol control unit 11 transmits the X.25-frame packet signal transferred from the gateway function unit 14 as a signal which can be transmitted as data of electrical and physical specifications in which the data can be transmitted as B-channel data.

6. Address Translation Unit 15

The address translation unit 15 converts destination network address information, on the packet frame, of the data transferred from the protocol analysis unit 9 into the telephone number information of the inter-LAN connection apparatus 2 to which an ISDN circuit is to be connected to transfer the telephone number information to the D-channel protocol control unit 12.

7. D-Channel Protocol Control Unit 12

The D-channel protocol control unit 12 calls using a D-channel protocol on the basis of the telephone number information transferred from the address translation unit 15 to connect the B channel of a circuit switching mode to the second inter-LAN connection apparatus 2 serving as a target.

8. B-Channel Protocol Control Unit 10

Upon completion of circuit connection by the D-channel protocol control unit 12, data transferred from the protocol analysis unit 9 as a signal which can be transmitted as data of electrical and physical specifications in which the data can be transmitted as B-channel data.

First, an operation of transmitting a packet from the first LAN 6 to the second LAN 7 will be described below. When a packet for the second LAN 7 from the first LAN 6 is received by the LAN interface unit 8 of the first inter-LAN connection apparatus 1, the protocol analysis unit 9 analyzes the protocol of the received packet and classifies it into data and control information.

The address translation unit 15 converts the destination network address of the data into a destination telephone number, and the D-channel protocol control unit 12 controls circuit connection between the first inter-LAN connection apparatus 1 and the second inter-LAN connection apparatus 2 through the DSU 3, the ISDN 5, and the second DSU 4. Upon completion of circuit connection, the data is transmitted to the second inter-LAN connection apparatus 2 through the first B-channel protocol control unit 10.

The control information is stored in the control information storage unit 13 and processed to transfer the control information to the second inter-LAN connection apparatus 2. Thereafter, the control information is converted by the gateway function unit 14 into a packet which is defined by Recommendation X.25 of the CCITT and can be transmitted in a packet switching mode, and the packet is transmitted to the second inter-LAN connection apparatus 2 through the second B-channel protocol control unit 11.

A packet transmitted from the second inter-LAN connection apparatus 2 to the first inter-LAN connection apparatus 1 through the second DSU 4, the ISDN 5, and the first DSU 3 is received, as data, from a B channel set as a channel in a circuit switching mode, and as control information, from a B channel set as a channel in a packet switching mode. The packet is transmitted from the LAN interface unit 8 to the first LAN 6 by a reverse process to the process of transmitting the packet from the first LAN 6 to the LAN interface unit 8.

Note that the present invention is not limited to the above embodiment, and various changes and modifications of the present invention can be effected without departing from the spirit and scope of the present invention. For example, in the above embodiment, although a B channel is assigned to a packet switching mode as a channel for transferring control information, in place of the B channel, a D channel may be assigned to the packet switching mode as the channel for transferring control information.

Prior Art 1 only discloses a technique in which a small number of processes are added while LAN communication is performed to connect terminals using the packet switching service and circuit switching service of the ISDN to each other through an ICU, thereby performing data communication. For this reason, unlike the present invention, Prior Art 1 does not disclose a technique in which a communication channel is set in a connected state using dynamic routing during only data communication. The object, arrangement, and effect of Prior Art 1 are different from those of the present invention. Prior Art 2 discloses only a technique of constructing a token ring LAN in which terminals of LANs are connected to each other by the two B channels of an ISDN basic interface. Unlike the present invention, Prior Art 2 does not disclose a technique in which a communication circuit is set in a connected state using dynamic routing during only data communication. The object, arrangement, and effect of Prior art 2 are different from those of the present invention.

As has been described above, in the inter-LAN connection method according to the present invention, when inter-LAN connection is to be performed through the ISDN, a user can receive a charging service corresponding to a connection time of a circuit switching mode with respect to data having a large data amount, and a user can receive a measured rate charging service according to a packet switching mode. For this reason, dynamic routing can be performed while the advantage of circuit switching is utilized. Therefore, if a network arrangement changes due to the failure or extension of a network, the inter-LAN connection apparatus automatically recognizes the change in arrangement, and the reliability of communication paths can be improved.

What is claimed is:

1. An inter-LAN connection apparatus for dynamically connecting a first LAN and a second LAN through an ISDN having at least two B channels and a D channel, said apparatus comprising:

a protocol analysis unit for processing a packet received from said first LAN into data and control information;

an address translation unit receiving said data from said protocol analysis unit and converting destination network address information from a packet frame of said packet into telephone number information of another inter-LAN connection apparatus associated with said second LAN;

a D-channel protocol control unit receiving said telephone number information from said address translation unit and processing said telephone number information to connect a first B-channel of said at least two B-channels of said ISDN, in a circuit switching mode, to said second LAN; and a first B-channel protocol control unit receiving said data from said protocol analysis unit and transmitting said data, in a circuit switching mode, from said inter-LAN connection apparatus through said first B-channel of said at least two B channels of said ISDN upon connection to said second LAN;

said inter-LAN connection apparatus transmitting said control information, in a packet switching mode, through one of a second B-channel of said at least two B-channels or said D-channel, to dynamically maintain routing of connection.

2. The inter-LAN connection apparatus of claim 1, further comprising:

a control information storage unit receiving control information from said protocol analysis unit and storing said control information; and a gateway function unit receiving said control information from said control information storage unit and converting said control information for transmission, in a packet switching mode, by one of said second B-channel or said D-channel of said ISDN.

3. The inter-LAN connection apparatus of claim 2, further comprising a second B-channel protocol control unit, said gateway function unit converting said control information into an X.25-frame signal to transfer said converted signal to said second B-channel protocol control unit for transmission over said second B-channel of said ISDN.

4. The inter-LAN connection apparatus of claim 2, further comprising a second B-channel protocol control unit, said control information storage unit transferring management packet signals to said gateway function unit, and said gateway function unit transferring said control information and said management packet signals to said second B-channel protocol control unit for transmission over said second B-channel of said ISDN.

5. The inter-LAN connection apparatus of claim 2, wherein said control information storage unit also transfers management packet signals to said gateway function unit, and said gateway function unit transfers said control information and said management packet signals to said D-channel protocol unit for transmission over said D-channel of said ISDN.

6. The inter-LAN connection apparatus of claim 2, further comprising a second B-channel protocol control unit receiving said converted control information from said gateway function unit and transmitting said control information to said second LAN over said second B-channel of said ISDN.

7. The inter-LAN connection apparatus of claim 2, wherein said D-channel protocol control unit receives said converted control information from said gateway function unit and transmits said control information to said second LAN over said D-channel of said ISDN.

8. The inter-LAN connection apparatus of claim 2, wherein said gateway function unit converts said control information into an X.25-frame signal to transfer said converted signal to said D-channel protocol control unit for transmission over said D-channel of said ISDN.

9. The inter-LAN connection apparatus of claim 1, wherein said ISDN is an Information Network System (INS) net 64 having two B-channels and one D-channel.

10. The inter-LAN connection apparatus of claim 1, wherein said ISDN is an Information Network System (INS) net 1500 having 23 B-channels and one D-channel.

11. The inter-LAN connection apparatus of claim 1, wherein said apparatus transmits said control information when required by a change in the configuration of said ISDN.

12. The inter-LAN connection apapratus of claim 1, wherein said apparatus further transmits a management signal to sustain said circuit connection.

13. A method of dynamically connecting a first LAN and a second LAN through an ISDN having at least two B-channels and a D-channel, each first and second LAN connected to an inter-LAN connection apparatus having a protocol analysis unit, an address translation unit, a first B-channel protocol control unit, and a D-channel protocol control unit, said method comprising the steps of:

processing a packet received from said first LAN by said protocol analysis unit of said inter-LAN connection apparatus of said first LAN into data and control information;

processing said data by said address translation unit of said inter-LAN connection apparatus of said first LAN and providing telephone number information of said inter-LAN connection apparatus of said second LAN;

processing said telephone number information by said D-channel protocol control unit of said inter-LAN connection apparatus of said first LAN to connect said first B-channel of said at least two B-channels of said ISDN, in a circuit switching mode, to said second LAN;

transmitting said data from said protocol analysis unit of said inter-LAN connection apparatus of said first LAN by said first B-channel protocol control unit of said inter-LAN connection apparatus of said first LAN, in a circuit switching mode, through said first B-channel of said ISDN upon connection to said second LAN; and transmitting said control information in a packet switching mode, through one of said second B-channel of said at least two B-channels or said D-channel to dynamically maintain routing connection.

14. The method of claim 13, wherein said inter-LAN connection apparatus includes a control information storage unit and a gateway function unit, and said method further comprises the steps of:

receiving and storing said control information by said control information storage unit;

converting said control information received from said control information storage unit by said gateway function unit; and transmitting said converted control information, in a packet switching mode, by said gateway function unit through one of said second B-channel or said D-channel.

15. The method of claim 14, wherein said inter-LAN connection apparatus of said first LAN further includes a second B-channel protocol control unit, and said method further comprises the steps of:

receiving said converted control information from said gateway function unit by said second B-channel protocol control unit; and transmitting said converted control information by said second B-channel protocol control unit to said second LAN over said second B-channel.

16. The method of claim 14, wherein said method further comprises the steps of:

receiving said converted control information from said gateway function unit by said D-channel protocol control unit; and transmitting said converted control information by said D-channel protocol control unit to said second LAN over said D-channel.

* * * * *